United States Patent
Ishibashi

(10) Patent No.: US 11,308,580 B2
(45) Date of Patent: Apr. 19, 2022

(54) IMAGE PROCESSING APPARATUS, IMAGE PROCESSING METHOD, AND RECORDING MEDIUM

(71) Applicant: CANON KABUSHIKI KAISHA, Tokyo (JP)

(72) Inventor: Tohru Ishibashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 16/893,231

(22) Filed: Jun. 4, 2020

(65) Prior Publication Data
US 2020/0388006 A1 Dec. 10, 2020

(30) Foreign Application Priority Data

Jun. 7, 2019 (JP) .............................. JP2019-106979

(51) Int. Cl.
| | | |
|---|---|---|
| *G06T 5/50* | (2006.01) | |
| *G06T 3/40* | (2006.01) | |
| *G06T 5/20* | (2006.01) | |
| *G06T 5/00* | (2006.01) | |

(52) U.S. Cl.
CPC ............ *G06T 3/4038* (2013.01); *G06T 5/007* (2013.01); *G06T 5/20* (2013.01); *G06T 5/50* (2013.01); *G06T 2207/20224* (2013.01)

(58) Field of Classification Search
CPC ........... G06T 3/4038; G06T 5/50; G06T 5/20; G06T 5/007; G06T 2207/20224; G06T 2207/20212
See application file for complete search history.

(56) References Cited

U.S. PATENT DOCUMENTS

2018/0299381 A1* 10/2018 Matsumoto .......... G02B 21/008

FOREIGN PATENT DOCUMENTS

| JP | 2004-147155 A | | 5/2004 | |
| JP | 2005077886 A | * | 3/2005 | ........... H04N 5/2253 |
| JP | 2018045396 A | * | 3/2018 | |
| JP | 2018201137 A | * | 12/2018 | |
| KR | 101516545 B1 | * | 5/2015 | |

\* cited by examiner

*Primary Examiner* — Matthew C Bella
*Assistant Examiner* — Kathleen M Broughton
(74) *Attorney, Agent, or Firm* — Canon U.S.A., Inc. IP Division

(57) ABSTRACT

An image processing apparatus includes an acquisition unit configured to acquire a plurality of continuous images, an extraction unit configured to extract a difference between two images among the plurality of continuous images, a first image processing unit configured to acquire a third image by removing a difference between portions smaller than a predetermined size from the difference extracted by the extraction unit, and a first combining unit configured to combine the two images by using the third image acquired by the first image processing unit. The image processing apparatus may implement the aforementioned units using a processor(s) that execute(s) a program of instructions stored in memory.

17 Claims, 6 Drawing Sheets

IMAGE PROCESSING APPARATUS, IMAGE PROCESSING METHOD, AND RECORDING MEDIUM

BACKGROUND

Field

The present disclosure particularly relates to an image processing apparatus, an image processing method, and a recording medium that are suitable for combining a plurality of images.

Description of the Related Art

Conventionally, there has been known a technique of performing a long-time exposure to capture an image of, for example, a diurnal motion of a celestial object as a locus. In this case, if exposure is performed for a long time, entirety of the image becomes brighter according to the exposure time. Therefore, imaging is performed a plurality of times until a predetermined time is reached, and brighter portions of the obtained plurality of images are selected and combined to create the locus of the celestial object. However, during imaging performed a plurality of times, if there is, for example, car headlight as light from an object other than the celestial object or a portion illuminated by the car headlight even in one image, the background portion becomes bright, and the quality as an astronomical photograph degrades.

Japanese Patent Application Laid-Open No. 2004-147155 discusses a technique in which light from an object other than a star is detected from an obtained starry sky image, and light from an object other than a star is removed from image data to obtain a background image.

However, in the technique discussed in Japanese Patent Application Laid-Open No. 2004-147155, it is necessary to measure movement of stars due to rotation of the earth in order to detect light from objects other than the stars. Therefore, a specialized advanced apparatus is required.

SUMMARY

According to an aspect of the present disclosure, an image processing apparatus includes at least one memory that stores a program of instructions, and at least one processor that executes the program of instructions to cause the image processing apparatus to implement an acquisition unit configured to acquire a plurality of continuous images, an extraction unit configured to extract a difference between two images among the plurality of continuous images, a first image processing unit configured to acquire a third image by removing a difference between portions smaller than a predetermined size from the difference extracted by the extraction unit, and a first combining unit configured to combine the two images by using the third image acquired by the first image processing unit.

Further features of the present disclosure will become apparent from the following description of exemplary embodiments with reference to the attached drawings.

DESCRIPTION OF THE EMBODIMENTS

Hereinafter, an exemplary embodiment of the present disclosure will be described with reference to the drawings.

Figure 1:
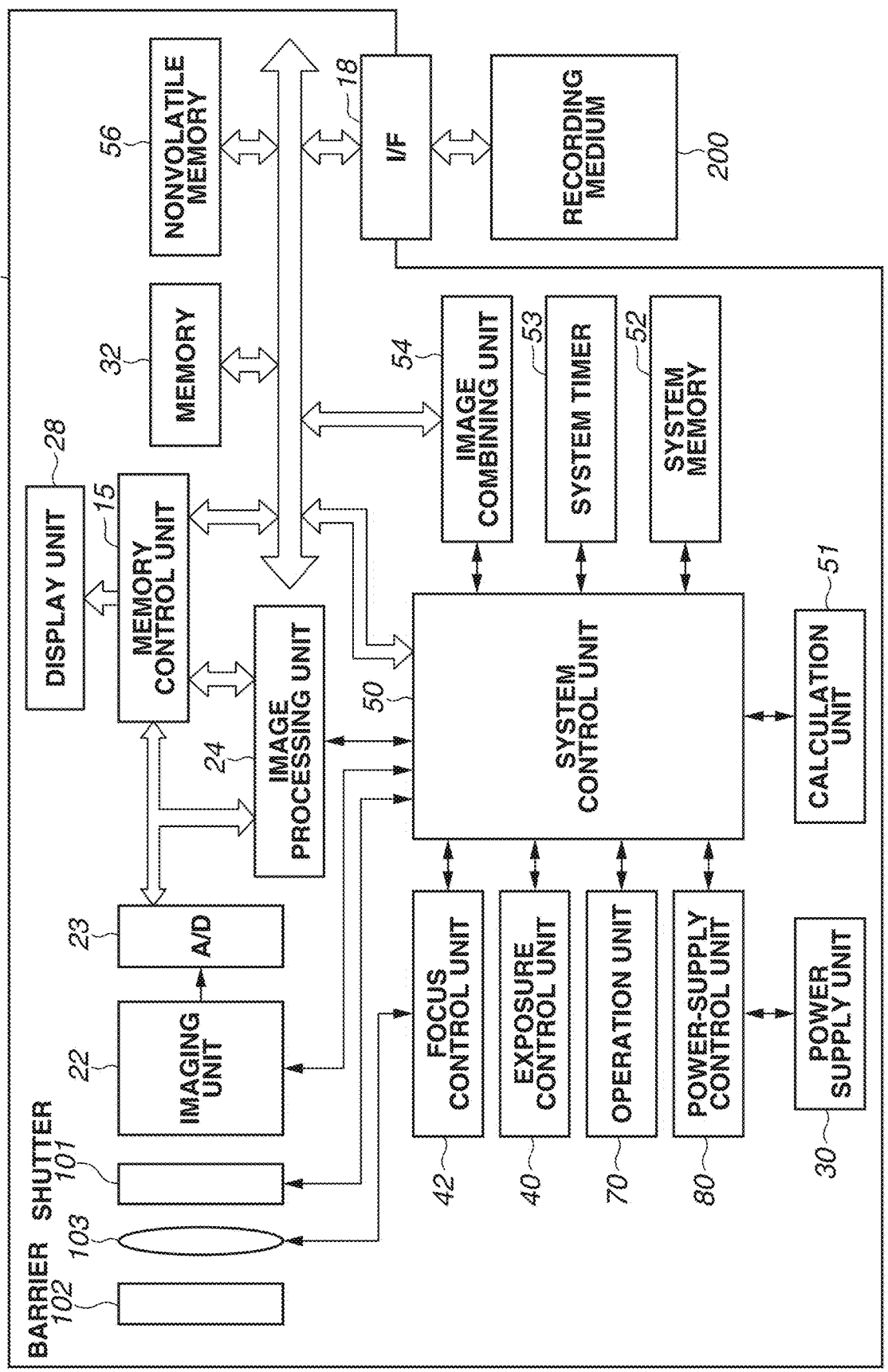
FIG. 1 is a block diagram illustrating an example of an internal configuration of a digital camera according to an exemplary embodiment.

FIG. 1 is a block diagram illustrating an example of an internal configuration of a digital camera 100 according to the present exemplary embodiment. In the present exemplary embodiment, the digital camera 100 will be described as an example of an image processing apparatus.

In FIG. 1, a shutter 101 is a mechanical shutter that has an aperture function, and an imaging unit 22 includes an imaging element that converts an optical image into an electrical signal. An A/D converter 23 converts an analog signal output from the imaging unit 22 into a digital signal. In the present exemplary embodiment, the imaging element of the imaging unit 22 includes color filters of R, G1, G2, and B, and has a Bayer pattern in which the respective colors are regularly arranged. However, the imaging element is not limited thereto. The imaging unit 22, an imaging lens 103, and the shutter 101 are controlled by a system control unit 50 using a timing generation circuit (not illustrated).

In addition to the function as the mechanical shutter, the shutter 101 can control storage time as an electronic shutter by controlling reset timing of the imaging element, and can be used for moving image capturing and the like.

An image processing unit 24 performs predetermined image processes on data from the A/D converter 23 or data from a memory control unit 15. As the image processes, various correction processes such as pixel interpolation processing and shading correction, white balance processing, gamma correction processing, color conversion processing, and various filter effects such as a low-pass filter (hereinafter, LPF) effect are performed. In addition, the image processing unit 24 cuts out or resizes an image to realize an electronic zoom function. The shading correction processing corrects a brightness level in a screen so as to correct shading with respect to data from the A/D converter 23 or data from the memory control unit 15. The shading is caused by characteristics of the imaging lens 103 or characteristics such as aberration of the imaging unit 22. In the white balance (WB) processing, automatic white balance (AWB) processing for adjusting a white reference in the screen to white is performed on image data subjected to the shading correction processing. In the present exemplary embodiment, shading correction is correction that applies a gain for each pixel according to two-dimensional coordinates (position) of the imaging element of the imaging unit 22, and white balance processing is a process of applying a different gain for each of R, G1, G2, and B of the Bayer pattern.

In addition, the image processing unit 24 has a function of developing a raw image for each Bayer into a general-purpose image format such as a YUV format, and a function of encoding or decoding a raw image for each Bayer into a Joint Photographic Experts Group (JPEG) format or the like.

Further, the image processing unit 24 executes predetermined calculation processing using captured image data, and the system control unit 50 controls an exposure control unit 40 and a focus control unit 42 based on the obtained calculation result. Thus, autofocus (AF) processing and autoexposure (AE) processing using a through-the-lens (TTL) system can be performed.

An image combining unit 54 includes a composite processing circuit that combines a plurality of pieces of image data by using addition, average, or subtraction. In the present exemplary embodiment, the image combining unit 54 can further perform comparison lighten composition processing and comparison darken composition processing. The comparison lighten composition processing is to select an image having the brightest value in each pixel or each region of data of images to be combined and to combine the images to create data of one image. The comparison darken composition processing is to select an image having the darkest value in each pixel or each region of data of images to be combined and to combine the images to create data of one image. Furthermore, the image combining unit 54 also has an alpha blending function of combining two images by using a coefficient (a value). The image combining unit 54 can be integrated with the image processing unit 24.

The memory control unit 15 controls the A/D converter 23, the image processing unit 24, and a memory 32. Data of the A/D converter 23 is written in the memory 32 via the image processing unit 24 and the memory control unit 15, or data of the A/D converter 23 is written in the memory 32 directly via the memory control unit 15.

A display unit 28 is a display unit including a thin-film-transistor (TFT) liquid crystal or the like. Image data to be displayed written in the memory 32 is displayed by the display unit 28 via the memory control unit 15. The imaging unit 22 repeatedly performs exposure and readout at a predetermined cycle to sequentially acquire captured image data, and the captured image data are sequentially displayed on the display unit 28 via the image processing unit 24, the memory control unit 15, and the like. Thus, live view display and an electronic view finder function can be realized. In addition, the display unit 28 can select ON/OFF of the display according to an instruction from the system control unit 50. In a case where the display is turned OFF, power consumption of the digital camera 100 can be significantly reduced.

The memory 32 is a memory for storing data of a captured still image and moving image, and has a sufficient storage capacity for storing data of a predetermined number of still images and moving images for a predetermined time. As a result, it is possible to write a large amount of image data to the memory 32 at high speed even in continuous image capturing in which a plurality of still images is continuously captured. In addition, the memory 32 can also be used as a work area for the system control unit 50.

The system control unit 50 controls entirety of the digital camera 100. By executing a program recorded in a nonvolatile memory 56 described below, each process of the present exemplary embodiment described below is realized. For example, a random access memory (RAM) is used as a system memory 52. In the system memory 52, constants and variables for operation of the system control unit 50, a program read from the nonvolatile memory 56, and the like are developed. The system control unit 50 also performs display control by controlling the memory 32, the display unit 28, and the like.

A system timer 53 is a clocking unit that measures time used for various controls and time of a built-in clock. The nonvolatile memory 56 is a memory that includes a Flash read only memory (ROM) or the like. Program codes executed by the system control unit 50 are written into the nonvolatile memory 56, and the program codes are sequentially read out and executed. Further, a region for storing system information and a region for storing user setting information are provided in the nonvolatile memory 56. Therefore, various information and setting information are read out and restored upon startup.

An operation unit 70 includes various buttons, a touch panel, and the like. The operation unit 70 includes a shutter button, a menu button, a set button, a macro button, a flash setting button, a single image capturing/continuous image capturing/self-timer switching button, and the like. The operation unit 70 also includes a menu move + (plus) button, a menu move − (minus) button, a captured image quality selection button, an exposure compensation button, a date/time setting button, and the like.

If the shutter button of the operation unit 70 is operated, shutter switches SW1 and SW2 can be turned ON. The shutter switch SW1 is turned ON during an operation of the shutter button, and instructs start of operations such as AF processing, AE processing, and AWB processing. The shutter switch SW2 is turned ON when the operation of the shutter button completes to instruct start of a series of processes such as an exposure process, a development process, a compression/decompression process, and a recording process.

A power supply unit 30 includes a primary battery such as an alkaline battery or a lithium (Li) battery, a secondary battery such as a nickel and cadmium (NiCd) battery, a nickel-metal hydride (NiMH) battery, or a lithium-ion (Li-ion) battery, an alternating current (AC) adapter, or the like. A power-supply control unit 80 controls the power supply unit 30. An interface (I/F) 18 is an interface with a recording medium such as a memory card or a hard disk, and a connector for connecting to a recording medium such as a memory card or a hard disk. A barrier 102 covers the imaging lens 103 and the imaging unit 22 of the digital camera 100, and thus prevents the imaging unit 22 from being stained or damaged.

In the present exemplary embodiment, a process for imaging a night view or a starry sky will be described. In the AE processing, in a case where a subject is a dark object such as a night view or a starry sky, the exposure control unit 40 keeps International Organization for Standardization (ISO) sensitivity low to suppress noise, and sets an aperture value of the imaging lens 103 close to an open aperture value so that dark stars can also be captured.

Even in a case where a starry sky is dark, the background becomes brighter than the actual background after long exposure. Therefore, a plurality of images is captured with exposure time at which the background has a desired luminosity, and the image combining unit 54 conducts the comparison lighten composition on the plurality of images. As a result, a diurnal motion of a celestial object can be imaged as a locus. However, if light from an object other than a celestial object appears in the background even in one of the plurality of images, the light appears in the combined image due to characteristics of the comparison lighten composition. In the present exemplary embodiment, it becomes possible to obtain a high-quality image by removing light from an object other than a star. Hereinafter, processes of the present exemplary embodiment will be described with reference to the flowcharts of FIGS. 2 and 3 and explanatory diagrams of FIGS. 4 and 5.

Figure 2:
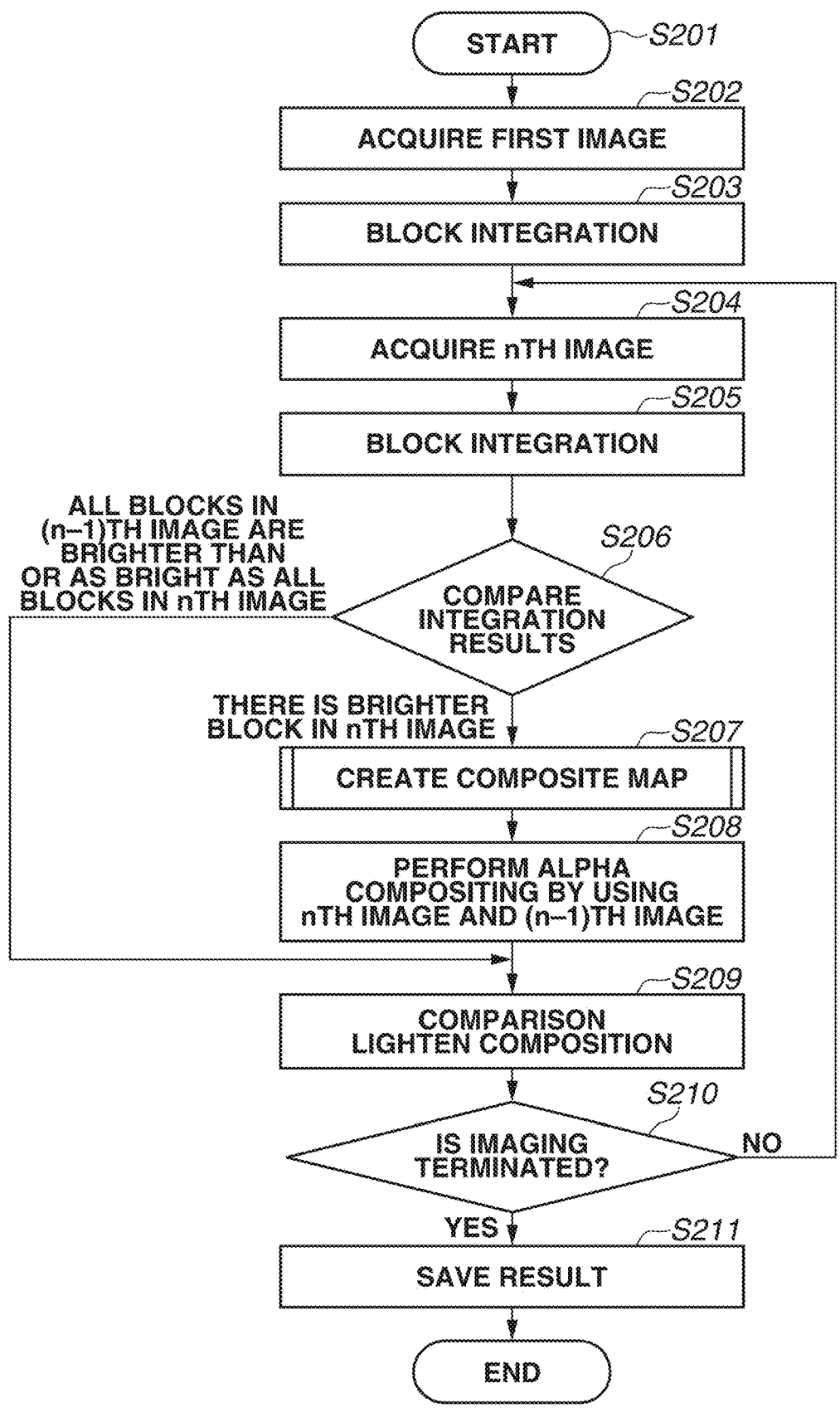
FIG. 2 is a flowchart illustrating an example of a process procedure for imaging a diurnal motion of a celestial object as a locus by conducting comparison lighten composition.

FIG. 2 is a flowchart illustrating an example of a process procedure for imaging the diurnal motion of a celestial object as a locus by conducting the comparison lighten composition.

When a user operates the operation unit 70 to instruct start of imaging, the processing starts in step S201. Then, in step S202, the system control unit 50 acquires a first image. As a method of acquiring an image, an image can be acquired by actually capturing the image, or an image can be acquired by reading out data of the image that has been captured and recorded in advance in the memory 32, the recording medium 200, or the like.

In step S203, the image processing unit 24 calculates brightness of each block by dividing the image acquired in step S202 into blocks and integrating the brightness for each pixel included in each block. The results are stored in the memory 32.

In step S204, the system control unit 50 acquires an image captured next. Hereinafter, a description will be given assuming that the image to be processed is an nth image. This process is the same as that in step S202. Further, in step S205, the image processing unit 24 calculates brightness for each block with a procedure similar to that in step S203, and stores the results in the memory 32.

In step S206, the image processing unit 24 compares the block integration result calculated in step S205 with the block integration result of a temporally previous image calculated earlier. Specifically, blocks at an identical position are compared, the difference between the block integration result of the nth image and the block integration result of the (n−1)th image is extracted, and it is determined whether there is a block with the difference equal to or greater than a predetermined value.

In a case where there is no block with the difference between the block integration result of the nth image and the block integration result of the (n−1)th image equal to or greater than the predetermined value, it can be considered that light from an object other than a celestial object does not appear between the (n−1)th image and the nth image. Therefore, in this case, the processing proceeds to step S209. On the other hand, in a case where there is a block with the difference between the block integration result of the nth image and the block integration result of the (n−1)th image equal to or greater than the predetermined value, it can be considered that light from an object other than a celestial object appears between the (n−1)th image and the nth image. Therefore, in this case, the process proceeds to step S207.

Here, in a case where no celestial object exists in the (n−1)th image but a celestial object that has moved exists in the nth image, a difference by the brightness of the celestial object is generated in the block integration results. Accordingly, in the present exemplary embodiment, a determination is made by setting a threshold without making a determination simply on the basis of magnitude of the block integration results. In other words, in a case where a celestial object that has moved exists in the nth image, the difference between the block integration results is less than a predetermined value. Therefore, it is possible to prevent a determination that light from an object other than a celestial object appears from being erroneously made.

A case will be described where there is a block with the difference between block integration results equal to or greater than the predetermined value based on the extraction result of the difference between the block integration results in step S206. In a case where there is a brighter block in the nth image, it is highly likely that light from an object other than a celestial object that does not exist in the (n−1)th image, such as car headlight or a portion illuminated by the car headlight, appears. In that case, in step S207, the image processing unit 24 and the image combining unit 54 create a composite map. Here, details of the process of step S207 will be described with reference to FIGS. 3 to 5.

Figure 5:
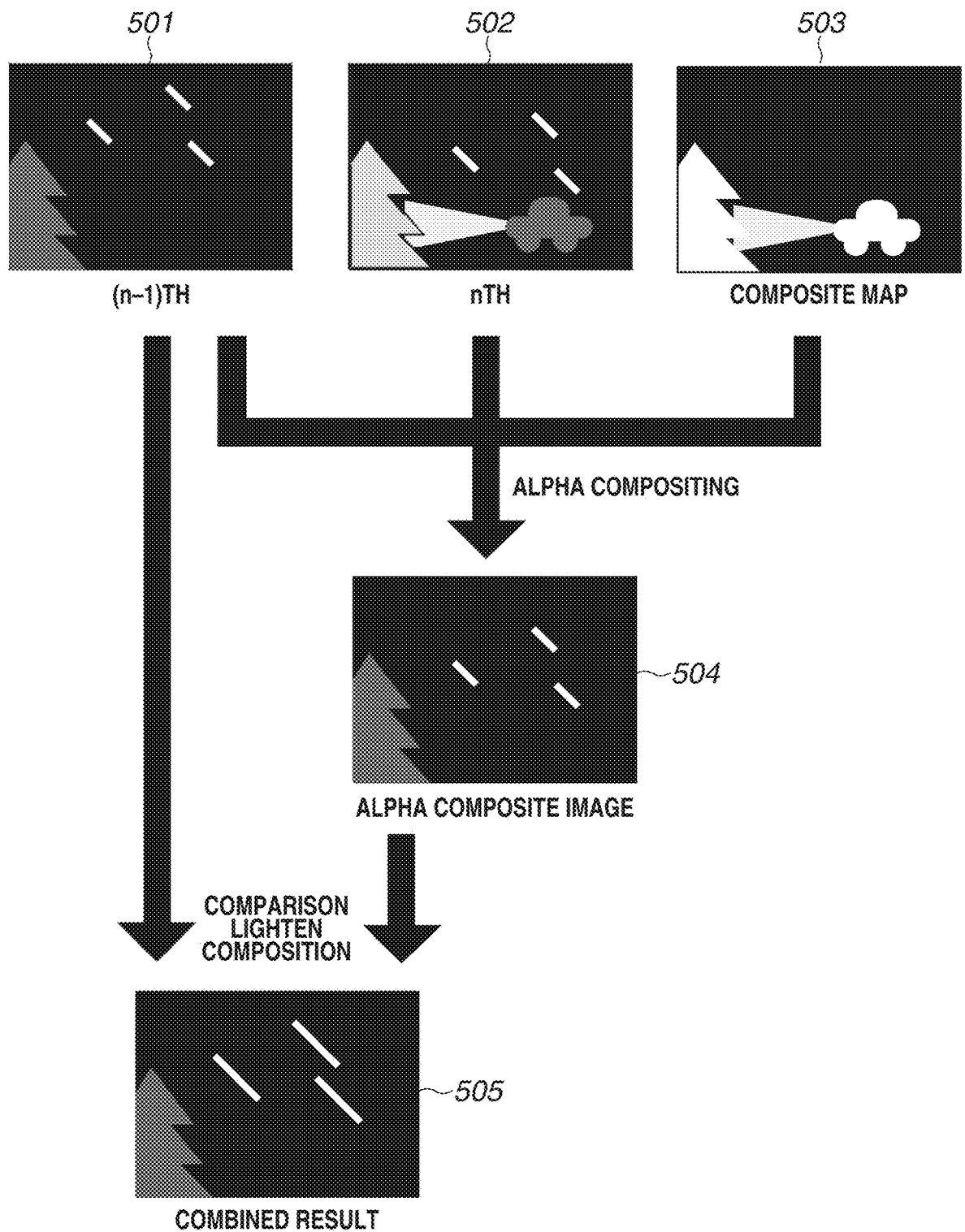
FIG. 5 is a diagram for explaining a procedure for conducting the comparison lighten composition.

In the present exemplary embodiment, as illustrated in FIG. 5, regarding a portion where light from an object other than a celestial object appears, an (n−1)th image 501 where light from an object other than a celestial object does not appear is selected, and regarding the other portion including the stars, an nth image 502 is selected. Then, an alpha composite image 504 is acquired by using the composite map 503, and a final combined result 505 is obtained. For this purpose, this composite map is created in step S207.

Figure 3:
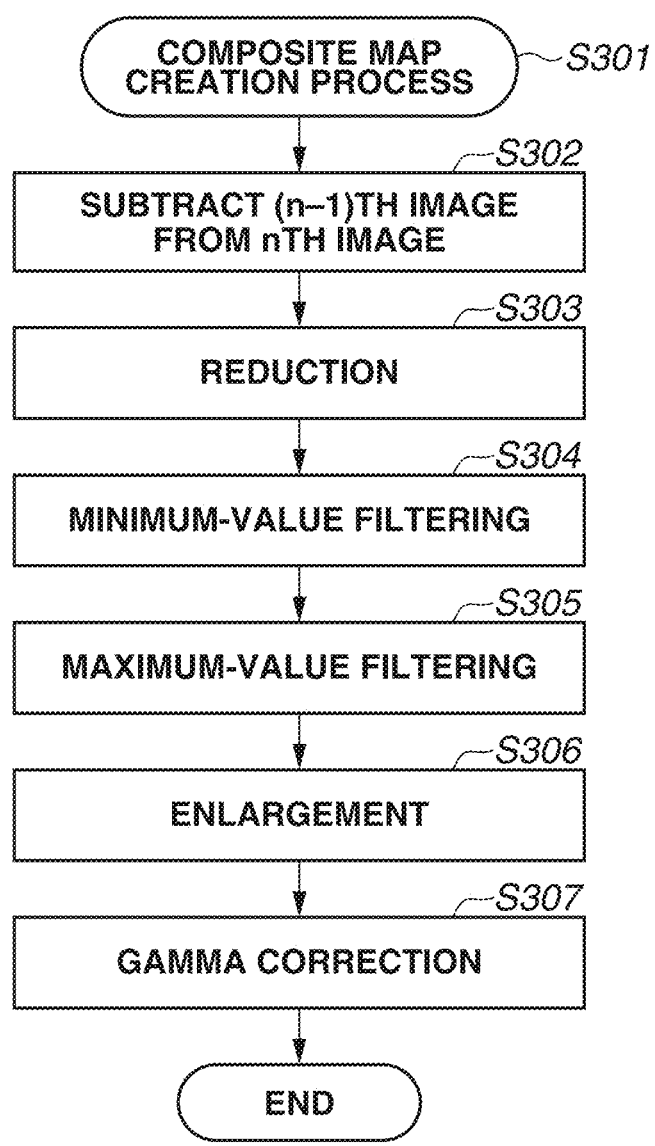
FIG. 3 is a flowchart illustrating an example of a detailed process procedure for generating a composite map.

FIG. 3 is a flowchart illustrating an example of the detailed processing procedure of step S207 in FIG. 2. Hereinafter, the processing procedure will be described by using images illustrated in FIG. 4 as examples.

Figure 4:
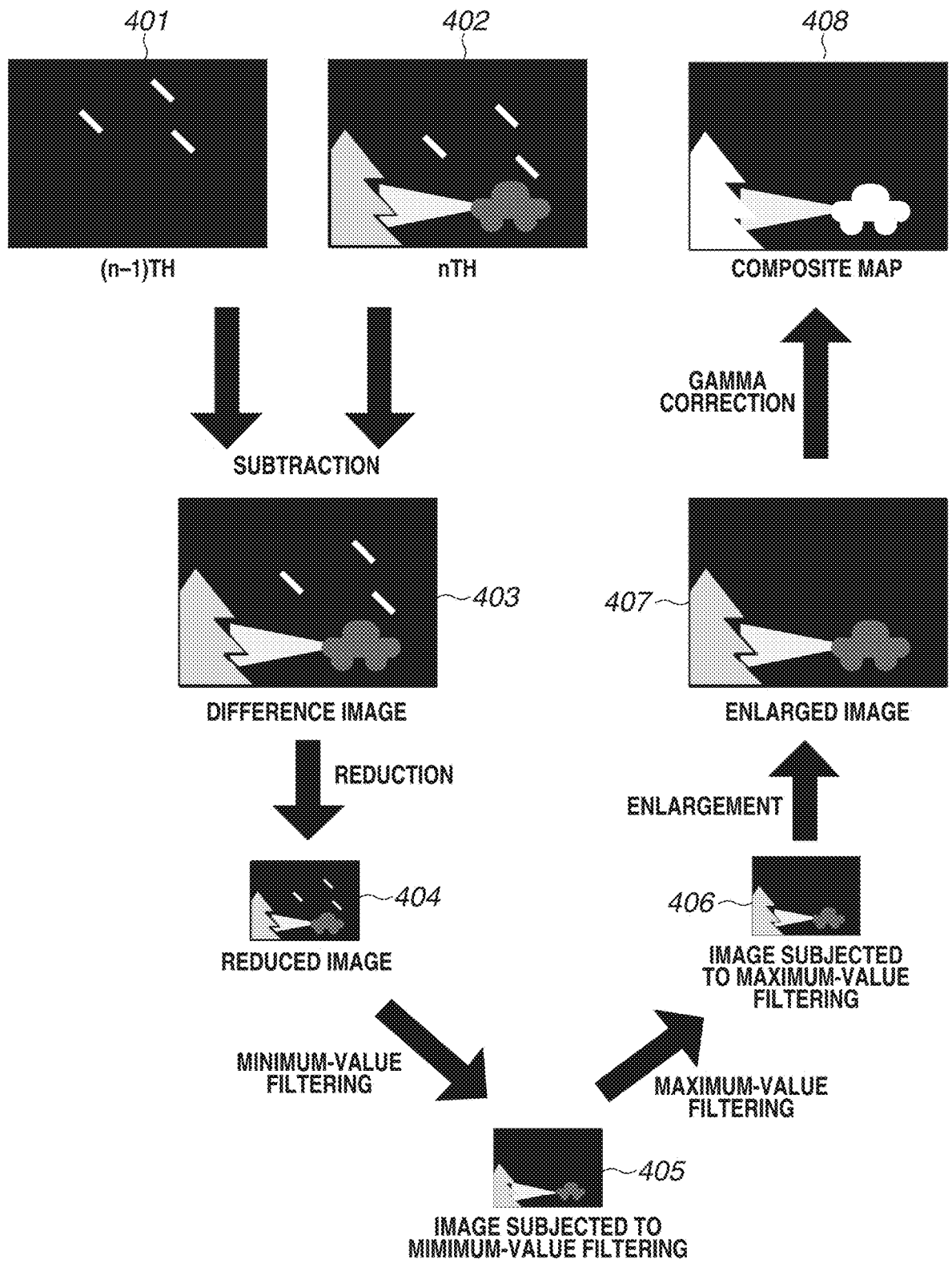
FIG. 4 is a diagram for explaining a procedure for generating the composite map.

When the processing starts in step S301, in step S302, the image combining unit 54 acquires a difference image 403 acquired by subtracting an (n−1)th image 401 from an nth image 402, as illustrated in FIG. 4. At this time, a pixel having a negative brightness value after subtraction is regarded as having a brightness value of zero. Then, in step S303, the image processing unit 24 acquires a reduced image 404 by reducing the difference image 403.

In step S304, the image processing unit 24 performs a minimum-value filtering process to acquire an image subjected to minimum-value filtering 405. Here, the minimum-value filtering process is a filtering process for replacing a target pixel with a pixel having the lowest brightness among pixels around the target pixel. For example, in the case of a 3×3 minimum-value filtering process, the target pixel is replaced with the darkest pixel among the eight pixels around the target pixel. By performing this process, it is possible to remove a point light source such as a star. On the other hand, in this processing, an edge portion is also reduced, and a headlight and a region illuminated by the car headlight are also reduced. Accordingly, in the present exemplary embodiment, the following processing of step S305 is performed.

In step S305, the image processing unit 24 performs a maximum-value filtering process on the image subjected to the minimum-value filtering 405 acquired in step S304, and acquires an image subjected to maximum-value filtering 406. In this process, the portion reduced is restored to an original size by performing the maximum-value filtering process with the number of taps identical to that in the minimum-value filtering process. The maximum-value filtering process is an opposite process of the above-described minimum-value filtering process, and is a filtering process of replacing a target pixel with a pixel having the highest brightness among pixels around the target pixel. Since a point light source such as a star has disappeared by the minimum-value filtering process, the point light sources will not be restored even if the maximum-value filtering process is performed. However, a large region such as the car headlight or the portion illuminated by the car headlight is restored to the original size.

In step S306, the image processing unit 24 enlarges the image subjected to maximum-value filtering 406 to the original image size, and acquires an enlarged image 407. Subsequently, in step S307, the image processing unit 24 creates a composite map 408 by performing gamma correction on and shaping the enlarged image 407.

Here, it is desirable that a reduction ratio and the number of taps of the filter be changed depending on imaging information of the imaging lens 103, the imaging unit 22, and the exposure time. In particular, regarding a point light source such as a star, the size (number of pixels) of a star projected on the imaging unit 22 can be predicted to some extent from the imaging information such as a focal length of the imaging lens 103 and a pixel pitch of the imaging unit 22. Although depending on the size of a star, in a case where the focal length is 24 mm and the pixel pitch is 3.5 μm, for example, the size of the star is about 10 pixels in diameter. In addition, if the aperture value of the imaging lens 103 is close to the open aperture value, a star becomes large due to aberration, and if the exposure time is too long, the shape of the star approaches an ellipse or a line. Therefore, the reduction ratio or the number of taps of the filter can be multiplied with a coefficient according to the aperture value or the exposure time.

Figure 6:
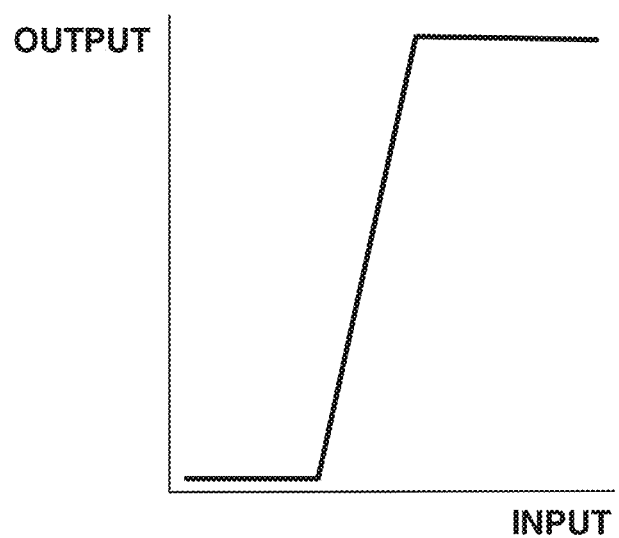
FIG. 6 is a diagram illustrating an example of a tone curve upon correction.

If the predicted size of the star is about 20 pixels, the reduction ratio in step S303 is 1/16, and the number of taps of each of the filters in steps S304 and S305 is about three, the point light source of the star can be removed in the process of step S304. However, in the enlarged image obtained in this manner, the point light source of a star may not be able to be clearly removed due to the influence of the size, aberration, and the like of the point light source. Accordingly, in step S307, correction is performed by using a tone curve as illustrated in FIG. 6. For example, in order to completely remove a portion that could not be completely removed, tone curve correction is performed such that 32 or smaller least significant bits (LSBs) are cut off and 64 or greater LSBs are exaggerated in the case of 256 gradations. As to the reduction ratio, the number of taps of the filter, and the tone curve, they are only examples and can be appropriately designed by those skilled in the art.

Returning to the description of FIG. 2, in step S208, the image combining unit 54 combines the images by using the composite map obtained in step S207. As illustrated in FIG. 5, the nth image 502 is used for the dark portion (region) of the composite map 503 created in step S207, and the (n−1)th image 501 is used for the bright portion (region) of the composite map 503. As a result, it is possible to obtain an alpha composite image 504 in which a portion where light from an object other than a star appears in the nth image is replaced with the corresponding portion in the (n−1)th image.

In step S209, the image combining unit 54 conducts the comparison lighten composition. In this process, in a case where it is determined in step S206 that there is no block in which the difference between the block integration results is equal to or greater than the predetermined value, the comparison lighten composition is conducted by using the nth image and the image obtained by conducting the comparison lighten composition using the (n−1)th image and the previous image. On the other hand, in a case where the alpha composite image is created in step S208, the comparison lighten composition is conducted by using the alpha composite image and the image obtained by conducting the comparison lighten composition using the (n−1)th image and the previous image. As a result of this process, the star that appears in the (n−1)th image and the star that has moved in the diurnal motion and appears in the nth image are combined, so that an image having an extended locus can be obtained. In a case where the comparison lighten composition is conducted for the first time, the comparison lighten composition is conducted by using the first image and the second image (or alpha composite image), so that the combined result 505 as illustrated in FIG. 5 can be obtained.

In step S210, the system control unit 50 determines whether an instruction to terminate imaging has been received from the operation unit 70 in accordance with a user operation. In a case where the instruction to terminate imaging has not been received as a result of this determination (NO in step S210), the processing returns to step S204 and the processing is repeated. In contrast, in a case where the instruction to terminate imaging has been received (YES in step S210), in step S211, the system control unit 50 performs a process of recording the combined result obtained in step S209 in the recording medium 200 or the like, and the processing ends.

As described above, according to the present exemplary embodiment, a composite map is created to create an alpha composite image. Therefore, even in a case where a light source other than a star inadvertently appears, a locus image of a diurnal motion of a celestial object can be acquired without deteriorating the quality.

Further, in the present exemplary embodiment, a portion in which light from an object other than a star (bright portion of a composite map) is replaced with a corresponding portion in the (n−1)th image. However, the portion can be replaced with a corresponding portion in the first image, not in the (n−1)th image. In that case, in the process of step S206, the block integration result of the nth image is compared with not a block integration result of the (n−1)th image, but a block integration result of the first image. Further in that case, in subtraction in step S302, subtracting the first image from the nth image is performed, and in step S208, alpha compositing is performed by using the nth image and the first image.

In addition, in the present exemplary embodiment, an example in which luminosity of images is compared and a composite map is generated only when necessary is described. However, in a case where there is no change in luminosity of images, an image subjected to alpha compositing is equivalent to an nth image. Therefore, the process of step S206 can be omitted, and the composite map can be created each time. Further, in the present exemplary embodiment, block integration results are compared based on captured images. However, in a case where a photometric sensor (not illustrated) is provided separately from the imaging unit 22, block integration results can be compared based on results obtained by the photometric sensor. In the present exemplary embodiment, application to a still image has been described. However, if this processing is performed for each frame of moving images, application to a time-lapse moving image in which images obtained in this manner are recorded as moving images is possible.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-106979, filed Jun. 7, 2019, which is hereby incorporated by reference herein in its entirety.

What is claimed is:

1. An image processing apparatus comprising:
   at least one memory that stores a program of instructions; and
   at least one processor that executes the program of instructions to cause the image processing apparatus to implement:
      an acquisition unit configured to acquire a plurality of continuous images;
      an extraction unit configured to extract a difference between two images among the plurality of continuous images;
      a first image processing unit configured to acquire a third image by removing a difference between portions smaller than a predetermined size from the difference extracted by the extraction unit, and the predetermined size is determined based on imaging information obtained when the plurality of continuous images is acquired, wherein the imaging information includes information on a focal length of an imaging lens or a pixel pitch of an imaging element, the acquired images being display on a display unit; and
      a first combining unit configured to combine the two images by using the third image acquired by the first image processing unit.

2. The image processing apparatus according to claim 1, wherein the at least one processor executes the program of instructions to cause the image processing apparatus to implement a second combining unit configured to select and combine brighter portions of a plurality of images, and
   wherein the second combining unit combines an image combined by the first combining unit with one of the plurality of continuous images or an image already combined by the second combining unit.

3. The image processing apparatus according to claim 2, wherein the at least one processor executes the program of instructions to cause the image processing apparatus to implement a determination unit configured to determine whether the first combining unit combines the two images based on an extraction result of the extraction unit, and
   wherein, in a case where the determination unit determines that the first combining unit combines the two images, the first combining unit combines the two images by using the third image acquired by the first image processing unit.

4. The image processing apparatus according to claim 3, wherein the extraction unit extracts the difference by comparing integration results obtained by integrating brightness for each region in the two images, and
   wherein the determination unit determines that the first combining unit combines the two images in a case where there is a region where the difference between the integration results is equal to or greater than a predetermined value.

5. The image processing apparatus according to claim 1, wherein the first image processing unit performs a minimum-value filtering process and a maximum-value filtering process to acquire an image obtained by removing a difference between portions smaller than the predetermined size.

6. The image processing apparatus according to claim 1, wherein the two images are temporally continuous images.

7. The image processing apparatus according to claim 1, wherein the at least one processor executes the program of instructions to cause the image processing apparatus to implement a second image processing unit configured to perform gamma correction on the third image acquired by the first image processing unit, and
   wherein the first combining unit combines the two images by using the image subjected to the gamma correction.

8. An image processing method comprising:
   acquiring a plurality of continuous images;
   extracting a difference between two images among the plurality of continuous images;
   performing image processing to acquire a third image by removing a difference between portions smaller than a predetermined size from the difference extracted in the extracting, and the predetermined size is determined based on imaging information obtained when the plurality of continuous images is acquired, wherein the imaging information includes information on a focal length of an imaging lens or a pixel pitch of an imaging element, the acquired images being display on a display unit; and
   first combining the two images by using the third image acquired in the image processing.

9. The image processing method according to claim 8, further comprising second combining,
   wherein the second combining includes:
   selecting and combining brighter portions of a plurality of images, and
   combining combines an image combined by the first combining with one of the plurality of continuous images or an image already combined by the second combining.

10. The image processing method according to claim 8, further comprising performing a minimum-value filtering process and a maximum-value filtering process to acquire an image obtained by removing a difference between portions smaller than the predetermined size.

11. The image processing method according to claim 8, wherein the two images are temporally continuous images.

12. The image processing method according to claim 8, further comprising performing gamma correction on the acquired third image,
   wherein the first combining combines the two images by using the image subjected to the gamma correction.

13. A non-transitory computer-readable storage medium storing a program for causing a computer to execute an image processing method, the method comprising:

acquiring a plurality of continuous images;

extracting a difference between two images among the plurality of continuous images;

performing image processing to acquire a third image by removing a difference between portions smaller than a predetermined size from the difference extracted in the extracting, and the predetermined size is determined based on imaging information obtained when the plurality of continuous images is acquired, wherein the imaging information includes information on a focal length of an imaging lens or a pixel pitch of an imaging element, the acquired images being display on a display unit; and first combining the two images by using the third image acquired in the image processing.

14. The non-transitory computer-readable storage medium according to claim 13, further comprising second combining, wherein the second combining includes:

selecting and combining brighter portions of a plurality of images, and combining combines an image combined by the first combining with one of the plurality of continuous images or an image already combined by the second combining.

15. The non-transitory computer-readable storage medium according to claim 13, further comprising performing a minimum-value filtering process and a maximum-value filtering process to acquire an image obtained by removing a difference between portions smaller than the predetermined size.

16. The non-transitory computer-readable storage medium according to claim 13, wherein the two images are temporally continuous images.

17. The non-transitory computer-readable storage medium according to claim 13, further comprising performing gamma correction on the acquired third image, wherein the first combining combines the two images by using the image subjected to the gamma correction.

* * * * *